United States Patent
Radhakrishnan et al.

(10) Patent No.: US 12,541,708 B2
(45) Date of Patent: Feb. 3, 2026

(54) TRUSTED AND DECENTRALIZED AGGREGATION FOR FEDERATED LEARNING

(71) Applicant: International Business Machines Corporation, Armonk, NY (US)

(72) Inventors: Jayaram Kallapalayam Radhakrishnan, Pleasantville, NY (US); Ashish Verma, Nanuet, NY (US); Zhongshu Gu, Ridgewood, NJ (US); Enriquillo Valdez, Queens, NY (US); Pau-Chen Cheng, Yorktown Heights, NY (US); Hani Talal Jamjoom, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 17/323,006

(22) Filed: May 18, 2021

(65) Prior Publication Data

US 2022/0374762 A1    Nov. 24, 2022

(51) Int. Cl.
*G06N 20/00* (2019.01)
*F02D 41/14* (2006.01)
(Continued)

(52) U.S. Cl.
CPC ......... *G06N 20/00* (2019.01); *F02D 41/1401* (2013.01); *F02D 41/401* (2013.01);
(Continued)

(58) Field of Classification Search
CPC ........ G06N 20/00; G06N 5/043; G06N 20/20; G06N 5/045; G06N 3/042; G06N 10/00;
(Continued)

(56) References Cited

U.S. PATENT DOCUMENTS 10,504,154 B1 * 12/2019 Bonawitz ........... G06Q 30/0269
10,839,320 B2    11/2020 Augustine et al.
(Continued)

FOREIGN PATENT DOCUMENTS

AU    2012231158 B2 *  5/2015  ............. G06Q 30/00
CA     2813026 A1 *  4/2012  ............. G06F 17/00
(Continued)

OTHER PUBLICATIONS

Pillutla, et al., "Robust Aggregation for Federated Learning," arXiv:1912.13445, Dec. 31, 2019.
(Continued)

*Primary Examiner* — Steven P Sax
(74) *Attorney, Agent, or Firm* — Eric W. Chesley

(57) ABSTRACT

Techniques for distributed federated learning leverage a multi-layered defense strategy to provide for reduced information leakage. In lieu of aggregating model updates centrally, an aggregation function is decentralized into multiple independent and functionally-equivalent execution entities, each running within its own trusted executed environment (TEE). The TEEs enable confidential and remote-attestable federated aggregation. Preferably, each aggregator entity runs within an encrypted virtual machine that support run-time in-memory encryption. Each party remotely authenticates the TEE before participating in the training. By using multiple decentralized aggregators, parties are enabled to partition their respective model updates at model-parameter granularity, and can map single weights to a specific aggregator entity. Parties also can dynamically shuffle fragmentary model updates at each training iteration to further obfuscate the information dispatched to each aggregator execution entity. This architectural prevents the aggregator from being a single point-of-failure, and serves to protect the model even if all aggregators are compromised.

22 Claims, 6 Drawing Sheets

(51) Int. Cl.
| | |
|---|---|
| *F02D 41/40* | (2006.01) |
| *F02M 47/02* | (2006.01) |
| *F02M 61/10* | (2006.01) |
| *G06N 5/043* | (2023.01) |

(52) U.S. Cl.
CPC .......... *F02M 47/027* (2013.01); *F02M 61/10* (2013.01); *G06N 5/043* (2013.01); *F02D 2041/1431* (2013.01); *F02D 2200/0602* (2013.01)

(58) Field of Classification Search
CPC ................ G06N 20/10; F02D 41/1401; F02D 41/401; F02D 2041/1431; F02D 2200/0602; F02M 47/027; F02M 61/10; G06F 21/00; G06F 21/575; H04W 88/02; G06Q 10/0635; H04L 9/50; H04L 2209/16
See application file for complete search history.

(56) References Cited

U.S. PATENT DOCUMENTS

| | | | |
|---|---|---|---|
| 10,848,974 | B2 | 11/2020 | Bachmutsky |
| 10,970,402 | B2 | 4/2021 | Verma et al. |
| 11,295,229 | B1 * | 4/2022 | Kumar .................... G06N 20/00 |
| 11,887,505 | B1 * | 1/2024 | Aloisio ................. G06T 19/006 |
| 2011/0142108 | A1 * | 6/2011 | Agee ......................... H04B 7/10 375/219 |
| 2018/0018590 | A1 * | 1/2018 | Szeto ...................... G16H 10/60 |
| 2019/0042878 | A1 | 2/2019 | Sheller et al. |
| 2019/0042937 | A1 | 2/2019 | Sheller |
| 2019/0213346 | A1 | 7/2019 | Friedman |
| 2019/0373021 | A1 * | 12/2019 | Parthasarathy ..... G06F 9/45558 |
| 2020/0133898 | A1 * | 4/2020 | Therene .................. G06F 3/061 |
| 2020/0358599 | A1 * | 11/2020 | Baracaldo Angel ........................ G06F 21/6227 |
| 2020/0380326 | A1 * | 12/2020 | Kawaguchi .......... G06K 19/0709 |
| 2020/0394470 | A1 * | 12/2020 | Ganapavarapu ....... G06N 20/00 |
| 2020/0394471 | A1 * | 12/2020 | Ganapavarapu .... G06F 18/2185 |
| 2021/0133555 | A1 | 5/2021 | Qiu et al. |
| 2021/0256407 | A1 * | 8/2021 | Therani .................... G06F 16/29 |
| 2022/0327652 | A1 * | 10/2022 | Sankaranarayanasamy ................ G06N 3/092 |
| 2022/0360450 | A1 * | 11/2022 | Brandenburger ..... H04L 9/0894 |
| 2024/0072981 | A1 * | 2/2024 | Zhu ....................... H04L 5/0094 |

FOREIGN PATENT DOCUMENTS

| | | | | |
|---|---|---|---|---|
| CA | 3060835 | C * | 4/2022 | ......... G06F 12/1408 |
| CN | 112580821 | A | 3/2021 | |
| CN | 112749812 | A | 5/2021 | |
| CN | 115424085 | A * | 12/2022 | |
| CN | 111966875 | B * | 8/2023 | ........... G06F 16/906 |
| CN | 117242463 | A | 12/2023 | |
| CN | 112906903 | B * | 2/2024 | ............. G06N 20/00 |
| CN | 109871702 | B * | 6/2024 | |
| DE | 102005045947 | B4 * | 11/2017 | ....... H04L 29/12103 |
| DE | 102020110034 | A1 * | 10/2021 | ......... H04L 63/0823 |
| DE | 112022002623 | T5 | 3/2024 | |
| EP | 3370083 | A1 * | 9/2018 | .......... G01S 13/762 |
| EP | 3471367 | A1 * | 4/2019 | ........... H04L 63/068 |
| EP | 3794771 | B1 * | 4/2025 | ............ H04L 9/3263 |
| GB | 2621732 | A | 2/2024 | |
| JP | 2023501335 | A * | 1/2023 | ............. G06N 3/063 |
| JP | 2024-519365 | A | 5/2024 | |
| KR | 20190075449 | A * | 7/2019 | |
| KR | 20220148017 | A * | 11/2022 | |
| TW | I798550 | B * | 4/2023 | |
| WO | 2019/227208 | A1 | 12/2019 | |
| WO | WO-2021056043 | A1 * | 4/2021 | ........... G06F 9/5033 |
| WO | 2021082647 | A1 | 5/2021 | |
| WO | WO-2021112831 | A1 * | 6/2021 | ............. G06N 20/00 |
| WO | WO-2021224453 | A1 * | 11/2021 | ............. G06N 10/00 |
| WO | 2022243871 | A1 | 11/2022 | |

OTHER PUBLICATIONS

Anonymous, "A Decentralized Architecture for Transparent and Verifiable Knowledge Manipulation in Untrusted Networks," IPCOM000251032D, Oct. 2, 2017.

Anonymous, "Identifying and Determining Trustworthiness of a Machine-Learned Model," IPCOM000252359D, Jan. 5, 2018.

Anonymous, "Decentralizing Reviews in E-Commerce Using Blockchain with Federated Learning," PCOM000264206D, Nov. 20, 2020.

Anonymous, Fully Decentralized Cloud using Generalized Trusted Execution Environments and Distributed Hash Tables (Without Blockchain), IPCOM000264923D, Feb. 5, 2021.

Wittkopp, et al., "Decentralized Federated Learning Preserves Model and Data Privacy," arXiv:2102.00880v1 [cs.LG] Feb. 1, 2021.

Kang, et al., "Scalable and Communication-efficient Decentralized Federated Edge Learning with Multi-blockchain Framework," arXiv:2008.04743v1 [cs.CR] Aug. 10, 2020.

Zhu et al., "Deep Leakage from Gradients," 33rd Conference on Neural Information Processing Systems, NeurIPS 2019.

Gu, et al., "Reaching Data Confidentiality and Model Accountability on the CalTrain," 2019 49th Annual IEEE/IFIP International Conference on Dependable Systems and Networks (DSN) IEEE, 2019.

Melis, et al., "Exploiting unintended feature leakage in collaborative learning," 2019 IEEE Symposium on Security and Privacy (Sp). IEEE, 2019.

Hitaj, et al., "Deep models under the GAN: Information leakage from collaborative deep learning," in Proceedings of the 24th ACM SIGSAC Conference on Computer and Communications Security, 2017.

Jayaram, et al., MYSTIKO: Cloud-Mediated, Private, Federated Gradient Descent, IEEE Cloud 2020, arXiv:2012.00740v1 [cs.CR] Dec. 1, 2020.

Abadi, et al., "Deep Learning with Differential Privacy," Proceedings of the 2016 ACM SIGSAC Conference on Computer and Communications Security, Oct. 24-28, 2016.

Jost et al., "Encryption Performance Improvements of the Paillier Cryptosystem", Cryptology ePrint Archive, 2015, 11 pages.

Lecun et al., "Deep learning" Abstract Only, Nature vol. 521, pp. 436-444 (2015), 20 pages.

Mahajan et al., "Exploring the Limits of Weakly Supervised Pretraining", arXiv:1805.00932v1 [cs.CV] May 2, 2018, 23 pages.

Patent Cooperation Treaty, International Search Report, International Application No. PCT/IB2022/054581, Jul. 28, 2022, 8 pages.

Sarwate et al., "Signal Processing and Machine Learning with Differential Privacy", Published in final edited form as: IEEE Signal Process Mag, Sep. 1, 2013; 30(5): 86-94, doi:10.1109/MSP.2013. 2259911, 17 pages.

Girgis et al., "Shuffled Model of Differential Privacy in Federated Learning", The 24th International Conference on Artificial Intelligence and Statistics, Apr. 13-15, 2021, 12 pages.

Grace Period Disclosure Cheng et al., "Separation of Powers in Federated Learning", Anonymous submission #220 to ACM CCS 2021, May 19, 2021, 14 pages.

Shokri et al., "Membership Inference Attacks Against Machine Learning Models", arXiv:1610.05820v2, Mar. 31, 2017, 16 pages.

The State Intellectual Property Office of People's Republic of China, "First Office Action", Aug. 29, 2025, 18 Pages, CN Application No. 202280032564.6.

Japan Patent Office, "Notice of Reasons for Refusal" Dec. 2, 2025, 11 Pages, JP Application No. 2023-571220.

* cited by examiner

TRUSTED AND DECENTRALIZED AGGREGATION FOR FEDERATED LEARNING

BACKGROUND

Technical Field

This disclosure relates generally to techniques for distributed machine learning.

Background of the Related Art

Federated learning (FL) provides a collaborative training mechanism, which allows multiple parties to build a machine learning (ML) model together. Instead of pooling all training data in a central training server (or datacenter), federated learning allows parties to retain private data within their trusted and protected domains/infrastructures. Each party trains a local model and only uploads model updates or gradients periodically to a central aggregation server. This aggregator fuses model updates and broadcasts the aggregated model back to all parties for model synchronization. The federated learning training setting presents a unique advantage for preserving training data privacy. This is particularly attractive for mutually distrusting/competing training parties, as well as for holders of sensitive data (e.g., health and financial data), where sharing data is prohibited by law or regulations.

There has been a misconception in federated learning, namely, that the exchanged model updates in FL communications contain less information than the raw training data. This has led to the conclusion that sharing model updates is considered to be "privacy-preserving." Model updates, however, are directly derived from the local training data. Although it may not be explicitly discernible, the training data information is still concealed in the model updates' representation. Recent research has challenged the privacy promises of federated learning. In particular, this research has demonstrated that, assuming an honest-but-curious central aggregation server, it is definitely possible for adversaries to infer private attributes or reconstruct training data by exploiting the model updates.

Existing techniques that address these issues are differentially private aggregation through the addition of statistical noise to model updates, and the use of cryptographic primitives, such as Secure Multi-Party Computation (SMC) protocols or Homomorphic Encryption (HE). Both techniques have several drawbacks. The former often significantly decreases the accuracy of the trained model and needs careful hyper-parameter tuning, while the latter is computationally expensive. Also, because parties do not trust each other, the central aggregator often runs on untrustworthy third-party (cloud) computing infrastructures and may become a single point of failure during attacks.

Thus, there remains a need to provide enhanced federated learning frameworks that address this threat model.

BRIEF SUMMARY

According to this disclosure, a federated learning system and method for neural network training to defend against privacy leakage and data reconstruction attacks is described. The approach herein provides enhanced protection against information leakage by leveraging a multi-layered defense strategy that comprises several aspects, namely, trustworthy aggregation, decentralized aggregation with model partitioning, and dynamic permutation.

As used herein, trustworthy aggregation refers to the notion of using trusted execution environments (TEEs) that provide runtime memory encryption and remote attestation to facilitate isolated and confidential execution on untrustworthy servers. Decentralized aggregation refers to the notion of partitioning the central aggregator into multiple independent and functionally-equivalent execution entities, with each such entity then running within an encrypted virtual machine. With multiple decentralized aggregators, parties have the freedom to disassemble model updates at model-parameter granularity and to map each single weight to a specific aggregator. Thus, preferably each aggregator only has a partial view of the model updates and is oblivious to model architectures. By decentralizing a single aggregator with model update partitioning, the approach prevents the aggregator from becoming a single point of failure under security attacks, e.g., those that target certain TEEs. Further, users can further deploy multiple aggregators to physical servers at different geo-locations and potentially with diversified TEEs on other microprocessors. Even if a subset of aggregators are breached, the adversaries cannot piece together the entire model update information.

In one example implementation, every aggregator execution entity runs within an encrypted virtual machine (EVM) with runtime memory encryption. Before participating in the training, each party to the federated learning remotely authenticates that the hardware is genuine and establishes an end-to-end secure channel for exchanging model updates.

According to an additional aspect, as mentioned above an additional defense strategy is referred to herein as dynamic permutation. Dynamic permutation leverages the notion that the arithmetic operations of federated learning fusion algorithms, e.g., Federated Stochastic Gradient Descent (FedSGD) and Federated Averaging (FedAvg), are bijective across model updates. Therefore, partitioning and (internally) shuffling a model update does not influence the fusion results. According to this aspect of the disclosure, the parties are provided the ability to dynamically shuffle fragmentary model updates at each training iteration to further obfuscate the information dispatched to each aggregator execution entity. This strategy guarantees that even if all decentralized aggregators are breached, adversaries are not able to decipher the correct ordering of the model updates for reconstructing the training data. Dynamic permutation is enabled when the party-side transformation of model updates is deterministic, reversible, and identical across parties.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
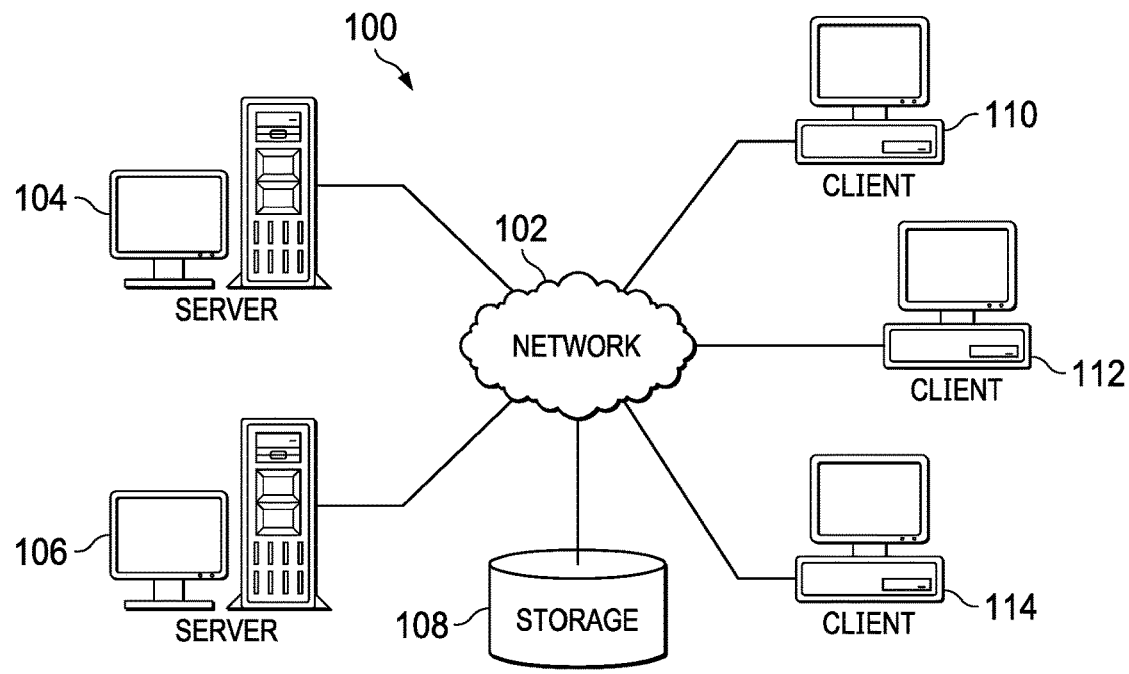
FIG. 1 depicts an exemplary block diagram of a distributed data processing environment in which exemplary aspects of the illustrative embodiments may be implemented.
Figure 2:
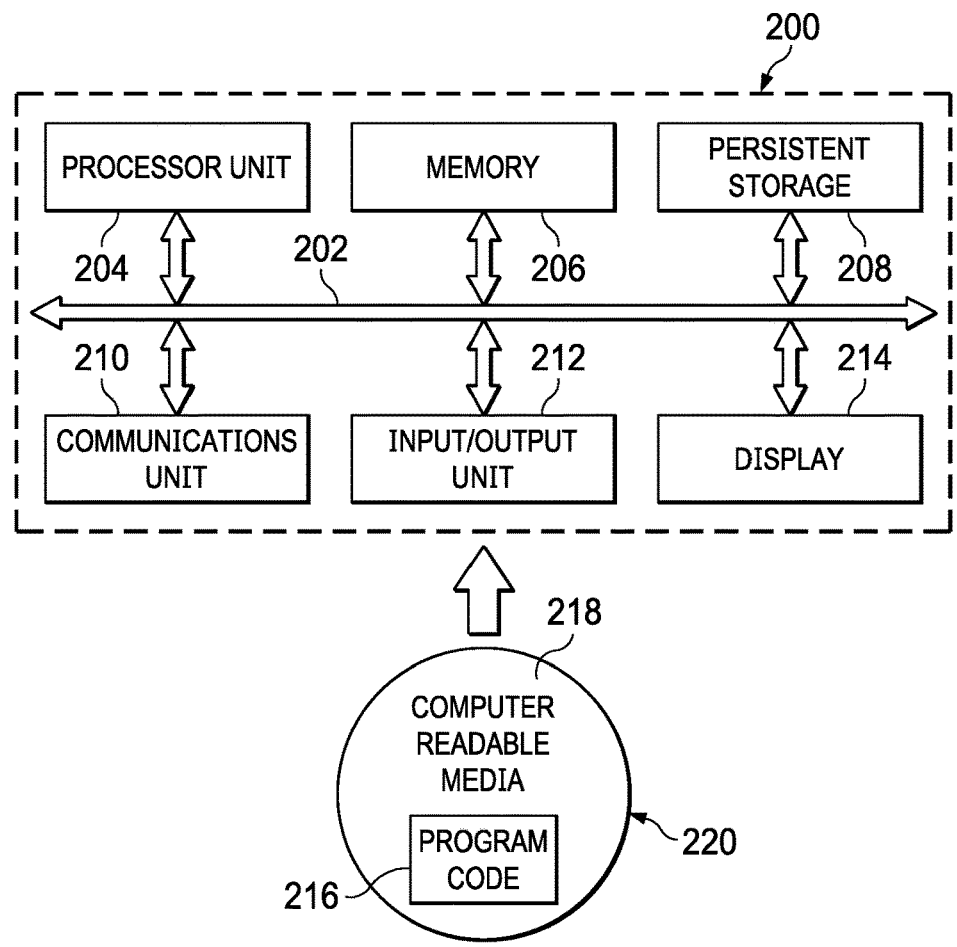
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The applications on the data processing system also can use native support for non-standard protocols, or private protocols developed to work on a TCP/IP network.

Cloud Computing Model

As described above, the distributed machine learning techniques of this disclosure preferably leverage computing elements that are located in a cloud computing environment. Thus, the following additional background regarding cloud computing is provided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
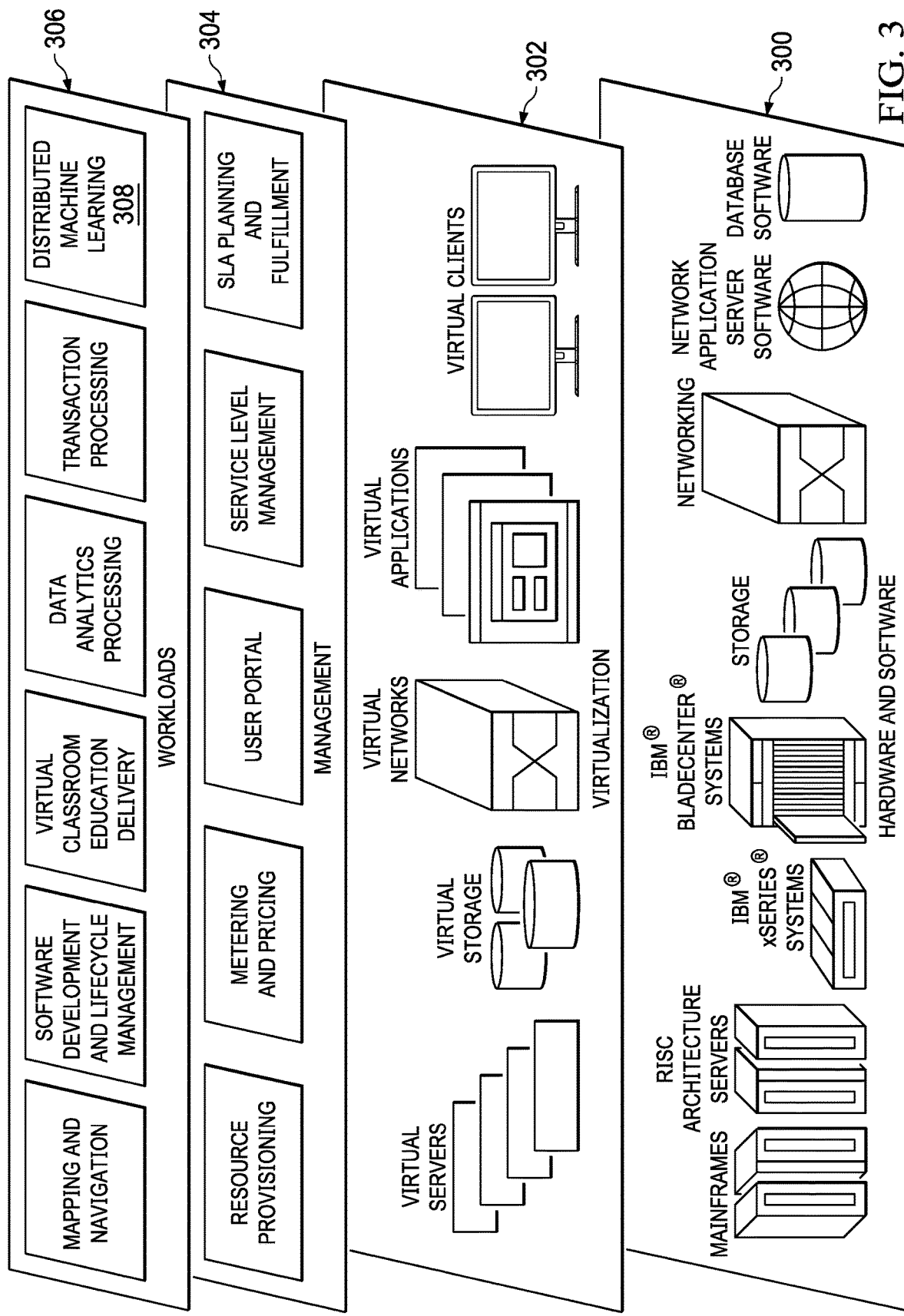
FIG. 3 depicts a cloud compute environment in which a fusion server of a secure distributed machine learning framework may be implemented according to this disclosure.

In a typical cloud computing environment, and as depicted in FIG. 3, a set of functional abstraction layers are provided. These include a hardware and software layer, a virtualization layer, a management layer, and a workload layer.

The hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer 302 provides an abstraction layer from which the following examples of virtual entities may be provided: virtual servers; virtual storage; virtual networks, including virtual private networks; virtual applications and operating systems; and virtual clients.

The management layer 304 provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

The workloads layer 306 provides the functionality for which the cloud computing environment is utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, distributed machine learning 308.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Federal Learning and Threat Models

Figure 4:
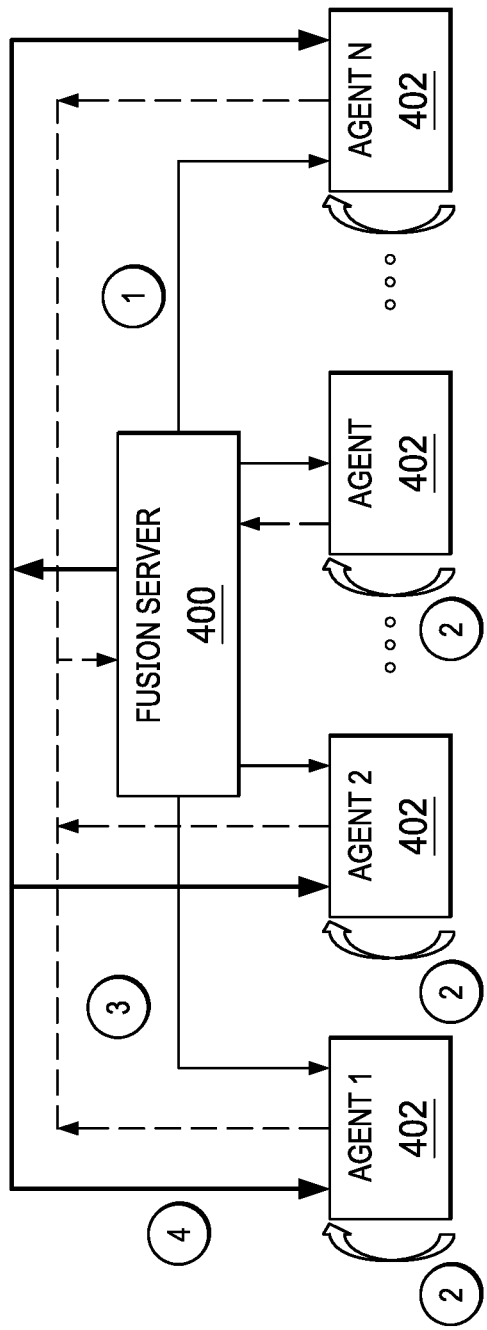
FIG. 4 depicts a distributed learning framework involving an aggregation server and a set of data owners/learning agents.

A known approach to distributed machine learning is depicted in FIG. 4. This system comprises a fusion (aggregation) server 400, and a number N of data owners or agents 402, sometimes referred to herein as learning agents. In this embodiment, each learning agent has access to a local dataset d typically consisting of labeled samples, and wants to train the same machine learning or neural network model. Each agent has its own dataset that it wishes to protect and cannot share with other agents or the aggregation server. In a typical operation, a distributed learning process may be carried out as follows. At step (1), each agent 402 contacts the aggregation server 400 to obtain hyper-parameters for training. In machine learning, a hyper-parameter is a parameter whose value is set before the learning process begins; in contrast, the values of other parameters are derived via the training. Each agent 402 trains the same type of neural network. In a representative example, a model associated with an agent then is characterized by a parameter vector $A=[p_1 \ldots p_k]$, which consists of several parameters. There are multiple agents in the system, with $A_i$ being a parameter vector given by agent i. At step (2), the $i^{th}$ agent trains the model on its local dataset $d_i$, and such training typically is done by taking a mini-batch, which is a small subset of the overall training data, and in so doing the $i^{th}$ agent computes its parameter vector $A_i$. At step (3), each agent 402 sends the resulting parameters to the aggregation server 400, which then fuses (typically by computing an average or weighted average for) each parameter in the vector. The average may use different priorities (weights m) for different agents; for example, if agent i gets a weight $m_i$, then the average parameter vector computed by the aggregation server is $\Sigma_i m_i A_i / \Sigma_i m_i$. At step (4), the aggregation server 400 publishes the average parameter vector back to the agents 402. The steps (2)-(3) are then repeated for a given number of iterations until the learning is considered to be completed.

It has been shown that the above-described process leads to the same model that would have been created if all data was collected at a single location and used to train the model, at least for loss functions that are additive, namely, indicator loss functions (e.g., cross-entropy loss, norm-based loss, binary-cross entropy, and others). The approach, however, has the challenge that it reveals the model to the aggregation server, which is typically a cloud-hosted service that may not be trusted by the data owners/agents that may not themselves be located in the cloud. As will be described below, the multi-layered security technique of this disclosure address this problem.

By way of further background, a key driver behind the emergence of federated learning has been the need to address privacy risks and constraints of centralized training, in which training data have to be collected from all parties and pooled to a central server for training. In FL, training data are kept decentralized in every participant's local devices. Participants (or parties) have to agree on the model architecture and maintain a local training pipeline. Instead of providing raw training data to a central server, as depicted in FIG. 4 each party trains a local model with its private training data and uploads the model updates to a central server. Typically, the aggregator also is responsible for managing parties, orchestrating training tasks, and merging model updates. The aggregated model updates are dispatched to parties for synchronizing their local models (typically) after each training iteration.

The following provides further additional background regarding training a DNN in the federated learning distributed setting. Denote $\theta$ as model parameters and L as the loss function. Each party has its own training data/label pairs $(x_i, y_i)$. The parties can choose to share the gradients $\nabla_\theta L_\theta (x_i, y_i)$ for a data batch to the aggregator. The aggregator computes the gradient sum of all parties and let the parties synchronize their model parameters locally: $\theta \leftarrow \theta - \eta \Sigma_{i=1}^{N} \nabla_\theta L_\theta(x_i, y_i)$. This fusion algorithm is known as FedSGD. Alternatively, the parties can also train for several epochs locally and upload the model parameters: $\theta^i \leftarrow \theta^i - \eta \nabla_{\theta^i} L_{\theta^i}(x_i, y_i)$ to the aggregator. The aggregator can compute the weighted average of model parameters $$\theta \leftarrow \Sigma_{i=1}^{N} \frac{n_i}{n} \theta_i,$$

where $n_i$ is the size of training data on party i and n is the sum of all $n_i$. Then the aggregator sends the aggregated model parameters back to the parties for synchronization. This model averaging fusion algorithm is called FedAvg. FedAvg and FedSGD are equivalent if one trains only one batch of data in a single FL training round and synchronizes model parameters, as gradients can be computed from the difference of two successive model parameter uploads. As FedAvg allows parties to batch multiple SGD iterations before synchronizing updates, it would be more challenging for privacy attacks to succeed, as the model parameters are obscured with more data infused.

Both FedSGD and FedAvg algorithms only involve bijective summation and averaging operations. In simple terms, if the model is represented as an array, these fusion algorithms perform coordinate-wise fusion across parties. That is, they add or average the parameter at index i of a model $M_1$ from party $P_1$ with the parameter at the same index i of model $M_2$ of party $P_2$—parameters at a given index i across parties can be fused without knowledge of those at any other index. Thus, one is able to partition the entire model update into multiple pieces, deploy them to multiple servers, and execute the same fusion algorithms independently. Furthermore, parameters or gradients can also be shuffled before aggregation, as long as all parties perform the same permutation. For FL privacy attacks, the completeness and data ordering of model updates are pivotal for the optimization procedure to reconstruct the training data. Lack of either leads to reconstruction failures. As will be described, the technique herein has no such limitation, as it is only required that parties can reverse the partitioning and permutation at the local sides.

In general, federated learning can be used in both cross-device and cross-silo scenarios. Generally cross-device FL training involves a large number of mobile or Internet of Thing (IoT) devices as clients. The clients are highly unreliable. The devices may join and drop out frequently, and they have energy constraints as a consequence of being often powered by batteries. Cross-silo FL training, however, typically involves a fixed number of organizations sharing the incentive to collaboratively learn a model together. They can provide reliable local training facilities. Therefore, aggregators can maintain party states and address parties with their unique IDs. Cross-silo training focuses more on the data privacy with strict requirements for data confidentiality. As will also be seen, the approach herein addresses the problems in the FL cross-silo training, but it can also be adapted to the cross-device domain.

The threat model herein assumes honest-but-curious aggregation servers. It is assumed that all parties involved in the FL training process are benign but do not tend to share training data with each other. The adversaries attempt to inspect the model updates uploaded from parties. Their purpose is to reconstruct the training data of the parties that participate in the FL training. This threat model is the same as in FL privacy attacks. Further, it is assumed that the parties involved in the FL trust the System-on-Chip (SoC) hardware and the EVMs that holds the model aggregation workloads.

System Design

The following details a representative design of the federated learning framework of this disclosure and describes how the approach effectively mitigates information leakage channels for FL privacy attacks. As noted above, the framework preferably leverages a multi-layered security approach that includes (1) trustworthy aggregation, (2) decentralized aggregation, and (3) dynamic permutation. The first aggregation technique enables confidential and trustworthy aggregation, preferably via remote-attestable encrypted virtual machines with runtime memory encryption (e.g., AMD® SEV EVMs). Secure Encrypted Virtualization (SEV), which is used in this example embodiment, is a computing technology introduced by AMD in 2016. It aims to protect security sensitive workloads in public cloud environments. SEV depends on AMD Secure Memory Encryption (SME) to enable runtime memory encryption. Combining with AMD Virtualization (AMD-V) architecture, SEV can enforce cryptographic isolation between guest VMs and the hypervisor. Therefore, SEV can prevent higher-privileged system administrators, e.g., at the hypervisor level, from accessing the data within the domain of an encrypted virtual machine. When SEV is enabled, SEV hardware tags all code and data of a VM with an Address Space Identifier (ASID), which is associated with a distinct ephemeral Advanced Encryption Standard (AES) key, called VM Encryption Key (VEK). The keys are managed by an AMD SP, which is a 32-bit ARM Cortex-A5 micro-controller integrated within the AMD SoC. Runtime memory encryption is performed via on-die memory controllers. Each memory controller has an AES engine that encrypts/decrypts data when it is written to main memory or is read into the SoC. The control over the memory page encryption is via the page tables. Physical address bit 47, a.k.a., C-bit, is used to mark whether the memory page is encrypted. Similar to other TEEs, SEV also provides remote attestation mechanism for authenticating the hardware platform and attesting the tobe-launched guest VMs. The authenticity of the platform is proven with an identity key signed by AMD and the platform owner. Before provisioning any secrets, guest VM owners verify both the authenticity of SEV-enabled hardware and the measurement of UEFI firmware, which assists in launching encrypted virtual machines.

Figure 5:
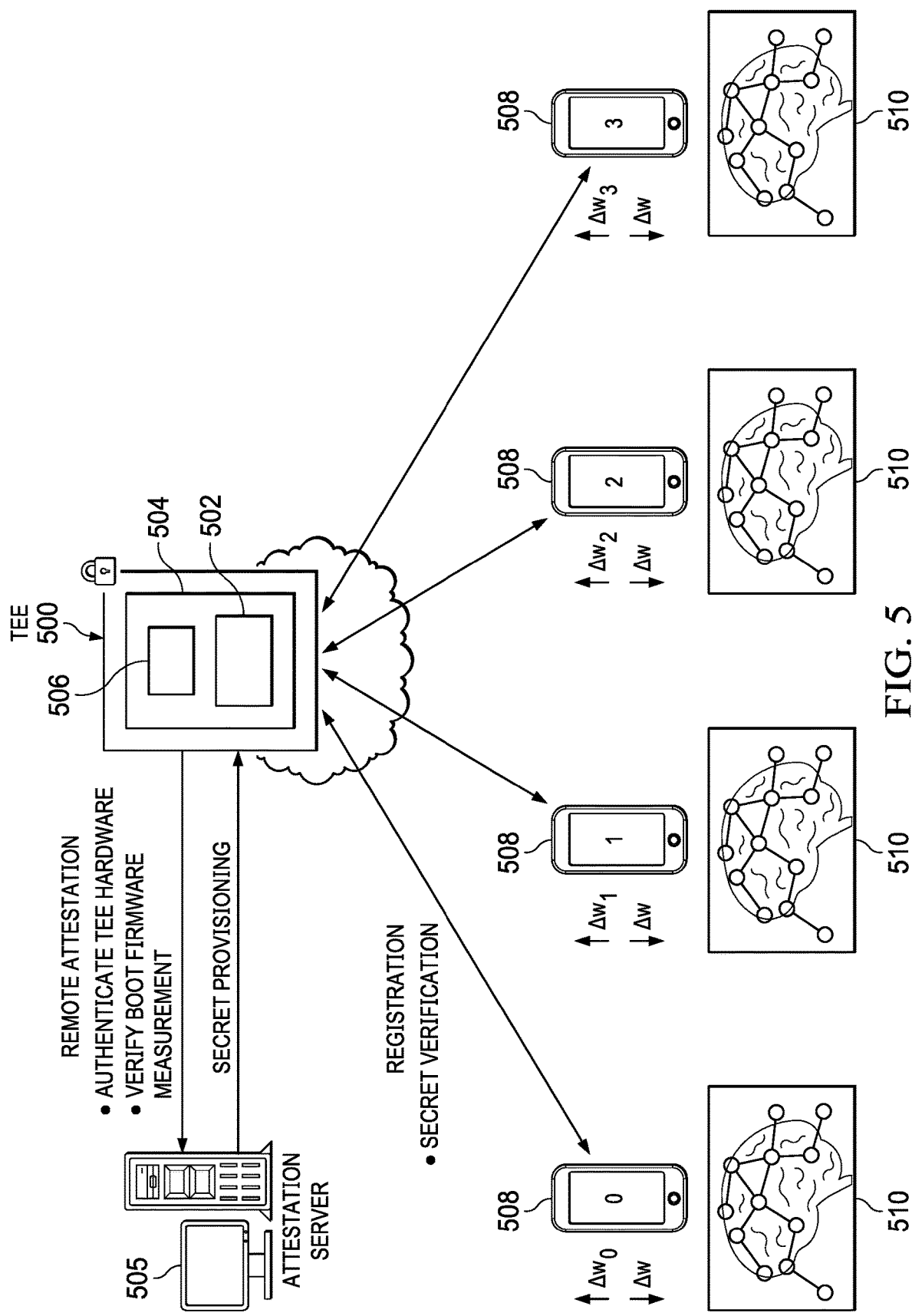
FIG. 5 depicts a first security technique, referred to herein as trusted aggregation.

FIG. 5 depicts this general notion of confidential aggregation. It is assumed that there are isolated and independent trusted executed environments, one of which is shown at 500, in the cloud, such as the cloud execution environment described above with respect to the FIG. 3. TEEs such as TEE 500 allow users to out-source their computation to third party cloud servers with trust on the CPU package. Representative TEE technologies include, e.g., Intel® SGX (Software Guard Extensions)/TDX (Trust Domain Extensions), AMD® SEV (as described above), IBM® PEF (Protected Execution Facility), ARM TrustZone, and others. TEEs are particularly attractive for collaborative ML computation that may involve a large amount of privacy-sensitive training data, multiple distributing parties, and stricter data protection are regulations. Here, and as will be described, the TEE 500 acts as a trustworthy intermediary for isolating an aggregator execution entity from other such execution entities that facilitate the federated learning.

As depicted in FIG. 5, the TEE 500 is associated with an operating system-based container mechanism (e.g., an open source container such as Kata Container) for packing and deployment, and it executes an isolated virtual machine. In particular, the TEE 500 runs an aggregator 502 within an encrypted virtual machine (EVM) 504 supported by runtime memory encryption (such as SEV) 506. Executing the aggregator inside the TEE mitigates memory corruption attacks. The aggregator 502 is one of a set of decentralized aggregators that together comprise the single aggregator depicted in FIG. 4. Each aggregator, such as aggregator 502, executes within an EVM 504, and an EVM memory is protected by a distinct ephemeral virtual machine encryption key (VEK). In this manner, the confidentiality of model aggregation computation also is protected from unauthorized users, e.g., system administrators, and privileged software, such as hypervisor or OS, running on the hosting servers. As will be described, the parties 508 to the federated learning each remotely authenticate the genuine SEV hardware/firmware before participating in the training and establish an end-to-end secure channel for exchanging model updates, as will be described. In particular, remote attestation, facilitated by the attestation server 505, is used to provide hardware authentication and load-time integrity checks of the aggregator. As also depicted, each party 508 has data and its own machine learning (ML) infrastructure 510 and typically collaborates by exchanging attributes (e.g., model gradients).

With the above as background, the following provides a more detailed description of a representative deployment example for the federated learning framework of this disclosure.

Figure 6:
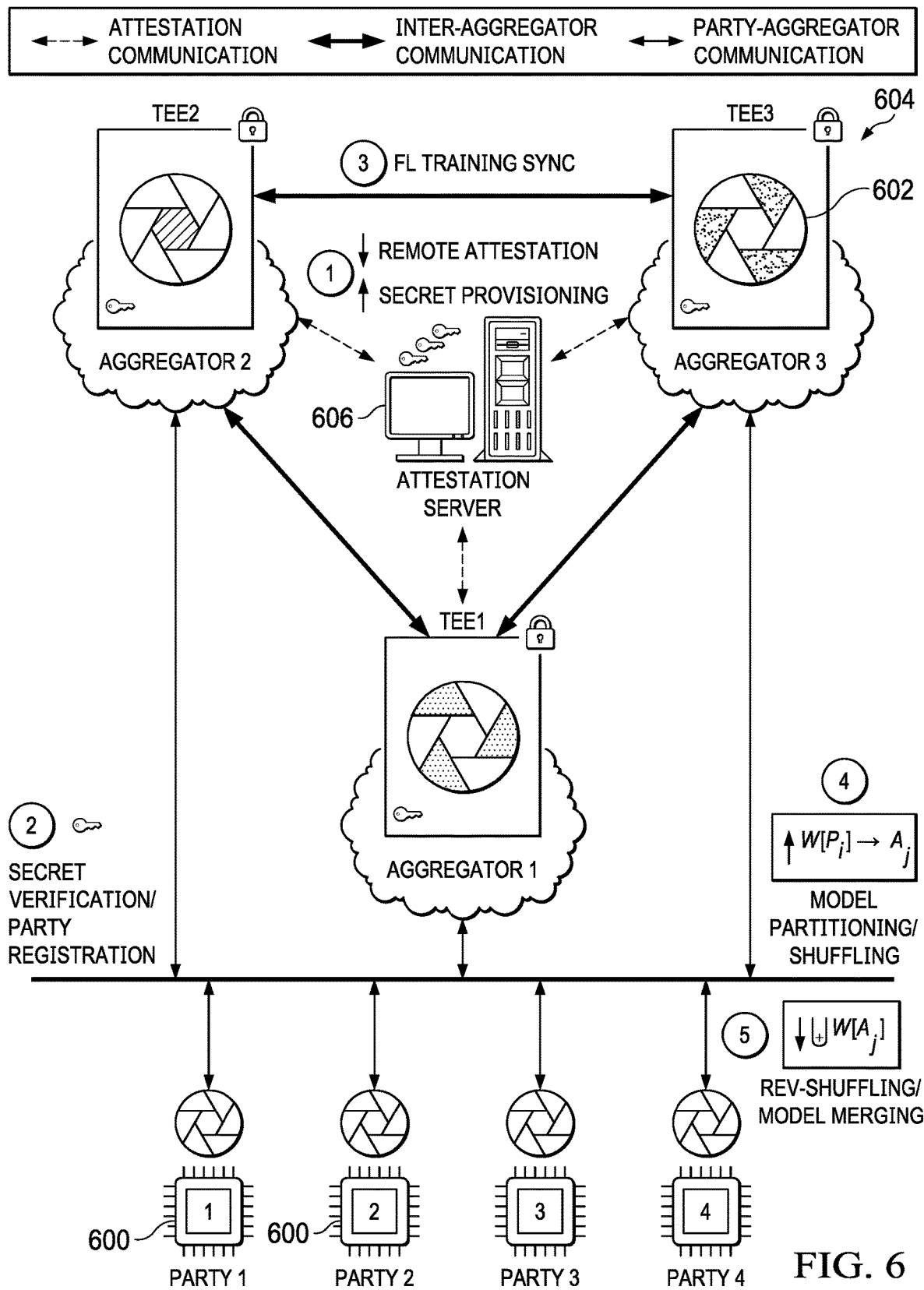
FIG. 6 depicts a system architecture that implements the trusted and decentralized federated learning of this disclosure.

A representative deployment example for the federated learning framework is shown in FIG. 6. In this example, there are four (4) parties 600 (numbered Party 1 through 4) participating in the federated learning, and the aggregation mechanism is decentralized into three (3) aggregator execution entities 602 (numbered Aggregator 1 through 3). Each aggregator execution entity 602 executes within a TEE 604, and thus there are three TEEs (number TEE1 through 3). Similar to traditional federated learning, in the approach herein, each party 600 needs to register with the aggregators 602 to participate in the training. Each party needs to verify the TEE platform, e.g., via remote attestation, before registration. One aggregator execution entity first initiates the training process by notifying all parties. During the training phase, aggregators engage in a number of training iterations with all parties. At each training iteration, each party first synchronizes the local model by downloading the latest model updates from the aggregators, then uses local training data to produce a new model update, and uploads it to the aggregators. The aggregators merge model updates from all parties and dispatch the aggregated version back to all parties. The global training ends once pre-determined training criteria are met, e.g., FL training reaches a specified number of training iterations or the parties can decide to quit the FL training once a model accuracy requirement is met locally. Different from traditional FL, the deployment involves the multiple aggregators 602 running within the TEEs 604, rather than a single central aggregator as was depicted in FIG. 4. In this system, aggregators 602 need to communicate with each other for training synchronization. In addition, an attestation server 606 that is responsible for attesting the aggregator's workload and provisioning secrets is also deployed, as will now be described.

Trustworthy Aggregation

As mentioned earlier, model updates exchanged between parties and aggregators may contain essential information for reverse engineering private training data. The following technique is used to eliminate the channels for adversaries to intercept and inspect the model updates in transit and also in use. In this design, preferably cryptographic isolation for the FL aggregation is enforced via a mechanism, such as (but not limited to) SEV. As noted in FIG. 5, the aggregators execute within EVMs, and each EVM's memory is protected with a distinct ephemeral VEK. In the embodiment shown in FIG. 6, establishing the trust between aggregators 602 and parties 600 is divided into two stages:

Stage I: Launching Trustworthy Aggregators

First, the SEV EVMs are securely launched with aggregators running within. To establish the trust of EVMs, attestation is provided to prove that (1) the platform is an authentic secure (e.g., AMD SEV-enabled) hardware providing the required security properties, and (2) a Unified Extensible Firmware Image (UEFI) to launch the EVM is not tampered. Once the remote attestation is completed, a secret is provisioned, preferably as a unique identifier of a trustworthy aggregator, to the EVM. The secret is injected into EVM's encrypted physical memory and used for aggregator authentication at Stage II described below. In FIG. 6, Step (1) shows the attestation server 606 that facilitates remote attestation. To this end, the EVM owner instructs a service provider (e.g., an AMD® SP) to export a certificate chain, e.g., from a Platform Diffie-Hellman Public Key (PDH) down to a root (e.g., AMD Root Key (ARK)). This certificate chain can be verified by the root certificates. In addition, preferably a digest of UEFI image, an SEV API version, and a VM deployment policy, are also included in the attestation report along with the certificate chain.

The attestation report is sent to the attestation server 606, which is provisioned with the root certificates to verify the certificate chain to authenticate the hardware platform. Thereafter, the attestation server 606 generates a launch blob and a Guest Owner Diffie-Hellman Public Key (GODH) certificate. These are sent back to the aggregation server 606 for negotiating a Transport Encryption Key (TEK) and a Transport Integrity Key (TIK) through Diffie-Hellman Key Exchange (DHKE) and launching the EVMs. The UEFI measurement can be retrieved through the SP by pausing the EVM at launch time. This measurement is sent to the attestation server 606 to prove the integrity of UEFI booting process. Only after that, the attestation server 606 generates a packaged secret, which preferably includes an ECDSA prime251v1 key. The hypervisor (not shown) injects this secret into the EVM's physical memory space as a unique identifier of a trusted aggregator and continue the launching process. The injection procedure for this secret preferably follows a remote attestation protocol, such as the $1^{st}$-generation SEV remote attestation protocol. Other remote attestation protocols, e.g., the upcoming SEV-SNP, may be implemented further reinforce the integrity of the launching process.

Stage II: Aggregator Authentication

Parties participating in FL must ensure that they are interacting with trustworthy aggregators with runtime memory encryption protection. To enable aggregator authentication, and as has been described above, at Stage I the attestation server 606 provisions an ECDSA private key as a secret during EVM deployment. This key is used for signing challenge requests and thus serves to identify a legitimate aggregator. In step (2) in FIG. 6, before participating in FL, a party first attests an aggregator by engaging in a challenge request protocol. To this end, the party 600 sends a randomly-generated nonce to the aggregator 602. The aggregator 602 digitally signs the nonce using its corresponding ECDSA private key and then returns the signed nonce to the requesting party. The party verifies the nonce is signed with the corresponding ECDSA public key. If the verification is successful, the party 600 then proceeds to register with the aggregator 602 to participate in FL. In addition, preferably secure channels are provided to protect the communication among aggregators and between the aggregators and parties for updating model parameters. Secure channels may be implemented using Transport Layer Security (TLS) to support mutual authentication between a party and an aggregator. In this manner, all exchanged model updates are protected both in use and in transmit.

Decentralized Aggregation with Model Partitioning

Although enabling trustworthy aggregation provides significant advantages, alone it may not be sufficient, as there is no guarantee that TEEs are omnipotent and there will be no security vulnerabilities revealed in the future. Therefore, the second security layer, decentralized aggregation with model partitioning, enhances the resiliency of the system to ensure that, even if TEEs are breached with data leakage, adversaries still cannot reconstruct training data from model updates. This aspect of this disclosure is now detailed, once again with respect to the representative implementation shown in FIG. 6.

As previously explained, each aggregator 602 runs within an EVM and is only responsible for a part of the model updates. In FIG. 6, three (3) aggregators are established and, as has been described above, each participating party authenticates and registers with all aggregators respectively. Decentralized aggregation is enabled as follows in this example.

Inter-Aggregator Training Sync. Communication channels are maintained between aggregators for training synchronization, e.g., step (3). Any one of the aggregators 602 can start the training iterations and become an initiator node by default. All the other aggregators become follower nodes and wait for the commands from the initiator. At each training iteration, the initiator first queries all parties to start local training and retrieve the model updates for fusion. Thereafter, the initiator notifies all the follower nodes to pull their corresponding model updates, aggregate them together, and distribute the aggregated updates back to the parties.

Decentralized aggregation does increase the cost for illegitimately obtaining model information at the aggregation point. Aggregators no longer keep the model architecture information; they only see vectors of numbers. In addition, even missing a very small portion of the model updates can totally render the data reconstruction attacks ineffective. Thus, this protection scheme requires a compromise of all TEE-protected aggregators to obtain a complete set of model updates.

Although compromise of all TEE-protected aggregators is very difficult, the following describes the third security layer, dynamic permutation, that may be implemented to further protect the federated learning from information leakage or other compromise.

Dynamic Permutation

To this end, and to further obfuscate the information transferred from the parties to the aggregators, a dynamic permutation scheme preferably is deployed to shuffle the partitioned model updates, preferably at every training iteration (or some other defined period). As noted above, the dynamic permutation scheme is based on the insight that the order of parameters in the model update is irrelevant for fusion algorithms, while they are crucial for data reconstruction algorithms used in FL privacy attacks. With this data order being obfuscated, it is infeasible for adversaries to generate reconstructed training data, even if they obtain the entire model updates.

Randomized Model Partitioning.

Figure 7:
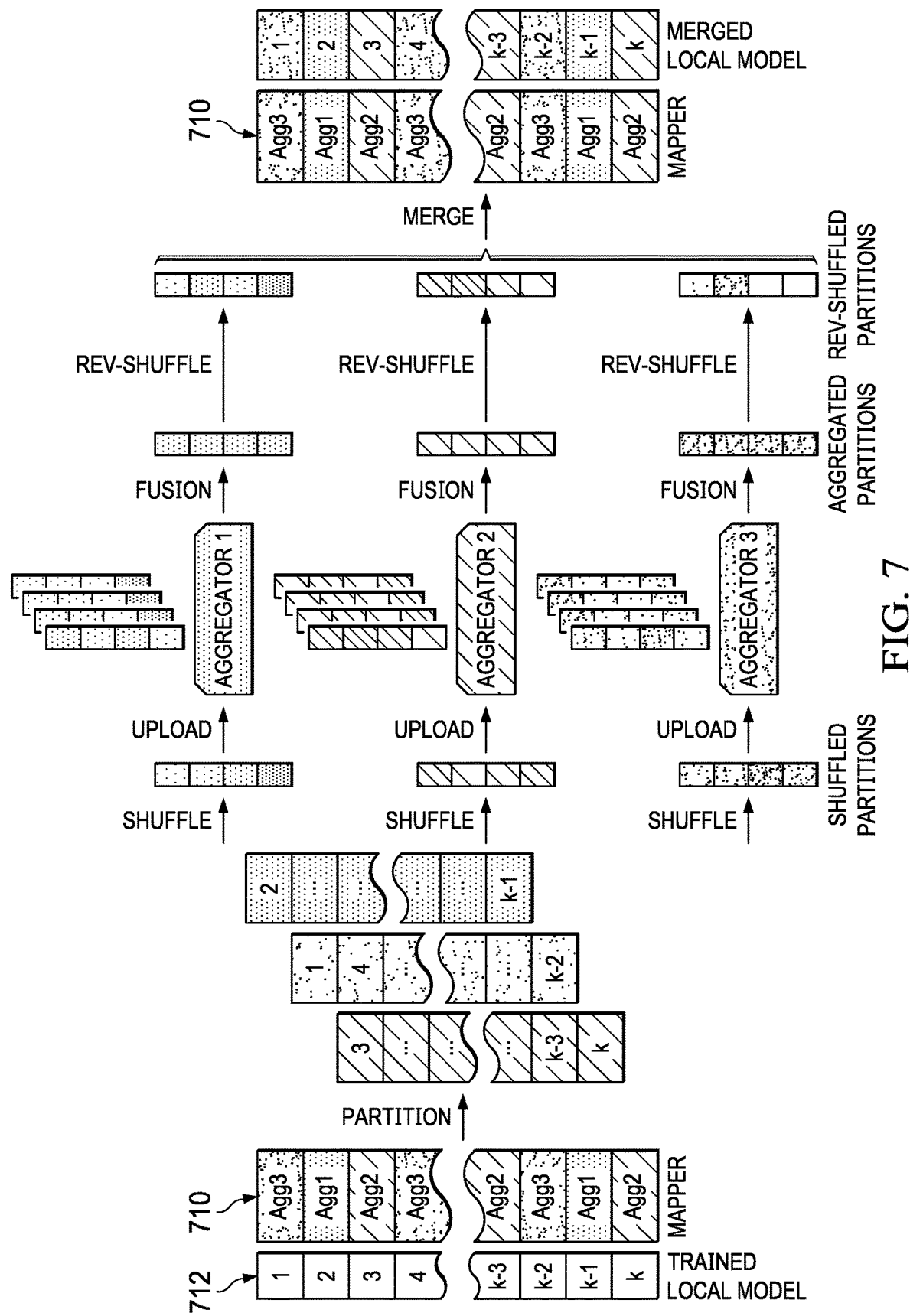
FIG. 7 depicts a representative implementation of the model partitioning and dynamic permutation scheme.

The model partitioning and dynamic permutation is depicted in FIG. 7, and with respect to the three (3) aggregators depicted there. In particular, aggregators 702 (Aggregator 1 through 3) correspond to the aggregators 602 in FIG. 6. Before training starts, an aggregator mapper 710 (a data structure) is randomly-generated for each to-be-trained DNN model. The parties choose the proportion of model parameters for each aggregator, although this can be set to a default. Also, the local parties must agree on the mapper 710, and thus this mapper 710 is shared by all the parties that participate in the FL training. In FIG. 7, a first party has a trained local model 712. As shown in FIG. 7, and using the mapper 710, the k parameters of the local model 712 are mapped to the three aggregators, i.e., Aggregators{1-3} as shown, with the shadings and cross-hatching depicted representing the aggregator attributes for each parameter within the model. As also shown, the model updates are disassembled and rearranged for different aggregators (step (4) in FIG. 6) to generate the shuffled partitions. The shuffled partitions are then uploaded to the respective aggregators and the fusion is carried out to generate the aggregated partitions. After parties receive aggregated model updates from the different aggregators, they reversely shuffle the aggregated model update to the correct order. The same mapper 710 is then queried again to merge model updates to original positions within the local model (step (5) in FIG. 6). In FIG. 7, only one local model (trained and then merged) is depicted, but each of the parties has its own such local model constructs.

Preferably, this dynamic permutation scheme shuffles the partitioned model updates at every training iteration. Each permutation is seeded with a secret agreed among all parties (e.g., disseminated via a trusted intermediary), and a dynamically-generated training iteration ID. Thus, preferably the permutation changes between every training iteration, but it is the same across all parties. Stated another way, the approach herein preferably shuffles the model updates dynamically at each training iteration with deterministic permutation. The aggregator (namely, the aggregator execution entities) merge model updates, and the parties are responsible for recovering the order of the aggregated model updates. The approach mitigates data leakage attacks by dynamically shuffling the order of the uploaded model parameters. In this manner, and among other benefits, the approach makes privacy protection of local training data more efficient in federated learning.

Thus, according to this aspect, preferably an entire model update that is generated by a party is partitioned into multiple pieces (partitions), with the partitions deployed to multiple servers (aggregation execution entities) at which the same fusion algorithms execute independently. Further, parameters or gradients (or, more generally, elements) are also shuffled (i.e., permutated) locally before aggregation, as long as all parties perform the same permutation. It is only required that parties can reverse the partitioning and permutation at the local sides. The local model update partitioning and permutation can be carried out periodically, e.g., at each training iteration, or at some other defined period; in the alternative, the update partitioning and permutation occur asynchronously.

The partitioning of the entire local model into the partitions, and the permutation of one or more elements within each partition, occur at each modeling iteration. All partitions either apply the same partitions or none. In addition, the partitioning and/or permutation strategy can be applied to a centralized aggregator (a case where the number of aggregation entities equals 1); in such case there is no partition, but there is permutation of the weights in the model update.

Generalizing, the dynamic permutation scheme as described above facilitates aggregated obfuscation in federated learning. A party to the federated learning (or, more generally, a first system of a plurality of systems engaged in the federated learning) determines that an update vector (or, more generally, an update) should be transmitted for fusion. An obfuscation algorithm is then applied to obfuscate the update vector to generate an obfuscated update vector. A secret that is shared by each of the parties may be used for this purpose, and each party to the federated learning uses the same shared secret to apply the obfuscation algorithm locally. As explained by example in FIG. 7, a preferred obfuscation algorithm exchanges an order of elements of the update vector to produce the obfuscated update vector. As used herein, the notion of exchanging the order of elements is synonymous with shuffling or permutating. The obfuscated update vector is then transmitted to each aggregator execution entity (when multiple such entities are used to create the machine learning model). The update may be performed at each training iteration, with different element orderings. While shuffling the update vector element order is a preferred technique for obfuscation, other obfuscation algorithms may be used.

The techniques described herein provides significant advantages. As a skilled person will appreciate, the approach secures and shields aggregation in federated learning from reverse engineering attacks while keeping overheads low and supporting many different deep learning models and frameworks. In addition, the techniques herein provide multiple structural and randomized model partitioning mechanisms to disassemble the exchanged model parameters. Thus, even if a subset of aggregators are compromised, adversaries are still prevented from reconstructing the training data information. Further, the techniques herein enable the learning participants to authenticate the trusted hardware platform and attest the workloads that are being subject to federated learning, therefore further ensuring that sensitive data is not exposed and transmitted without end-to-end cryptographic protection. The techniques herein do not impact the final model accuracy and convergence rate compared to traditional FL training. At the same time, the approach significantly minimizes non-essential party-to-aggregator information exposure, which is crucial for conducting FL privacy attacks.

As described above, the approach herein exploits the unique arithmetic properties of federated learning fusion algorithms and provides architectural and protocol enhancements to mitigate potential information leakage channels. The described federated learning system preferably employs three-layered security strategies, i.e., confidential and trustworthy aggregation, decentralized model partitioning, and dynamic permutation of model updates. A federated learning system that implements these security strategies is immune to training data reconstruction attacks.

Further, although preferably the three techniques are used together, this is not a requirement. Thus, a federated learning framework that implements the techniques of this disclosure may benefit from one or more of the following techniques and strategies. A first strategy enables trustworthy and remote-attestable model aggregation by leveraging confidential computing technologies. A second strategy involves decentralizing a single aggregator to multiple independent execution entities, preferably each with only a fragmentary view of the model updates and being oblivious to the model architectures. A third strategy provides support for randomized and dynamic permutations for the partitioned model updates at each training iteration to render data reconstruction algorithms infeasible. By implementing all three-layered security strategies, and as noted above, the system neutralizes state-of-the-art federated learning privacy attacks and exhibits low performance overhead in real-world deployment.

There are still additional advantages. One is that the distributed learning approach does not require generating auxiliary inputs, and training participants only share a subset of obfuscated model parameters in the federated learning process. The trusted execution environments protect confidentiality of the model updates data in transmission and in aggregation. Further, the approach prevents malicious or compromised aggregation servers from reconstructing training data of federated learning participants. The approach prevents both (i) honest but curious aggregators and (ii) malicious or compromised aggregators from reconstructing the private training data from model updates. Another advantage is that the same approach can be utilized for different FL tasks and can achieve the same level of training performance as baseline.

The above-described technique may be implemented using any machine learning algorithms or computations that are capable of being distributed in the manner described.

This subject matter may be implemented in whole or in part as-a-service. Generalizing, the trusted and decentralized aggregation for federated learning functionality may be provided as a standalone function, or it may leverage functionality from other ML-based products and services. For example, the security technique herein may leverage known offerings and solutions, such as IBM Framework for Federated Learning (FFL) to support the described trustworthy aggregation, decentralized multi-aggregators with model partitioning, and dynamic model updates permutation. Preferably, the aggregator application is containerized to facilitate its deployment, although this is not a requirement. Kata Containers may be employed to deploy aggregator containers inside lightweight VMs. Thus, and as has been described, preferably each aggregator container runs in an SEV protected EVM (or equivalent). To provide the TEE security functionalities, and in this exemplary but non-limiting embodiment, an AMD EPYC 7642 (Rome) microprocessor running firmware SEV API is used.

The functionality described above in whole or in part may be implemented as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, security systems, web portals, federated systems, and the like. As also noted, the techniques herein may be practiced in a loosely-coupled server (including a "cloud"-based) environment, such as described in association with FIG. 3.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the fusion server and each agent are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., machine learning systems, security incident and event management (SIEM) systems, other security systems, as well as improvements to automation-based cybersecurity analytics.

Having described the subject matter, what we claim is as follows.

The invention claimed is:

1. A method of providing federated learning with reduced information leakage of model aggregation, comprising:
    loading each aggregator execution entity included in a set of decentralized aggregator execution entities into a separate trusted execution environment that acts as a trusted intermediary for isolating each aggregator execution entity from other aggregator execution entities in the set, where each trusted execution environment utilizes a distinct encryption key to provide runtime memory encryption protection for a respective aggregator execution entity;
    registering each of multiple parties with each of the aggregator execution entities included in the set of decentralized aggregator execution entities;
    establishing and maintaining a secure communication channel between the aggregator execution entities for training synchronization during the federated learning;
    distributing to each aggregator execution entity included in the set of decentralized aggregator execution entities an assigned portion of a partitioned model update for a machine learning model provided by the multiple parties; and
    initiating execution of the set of decentralized aggregator execution entities to train the machine learning model using the assigned portions of the partitioned model update, wherein the set of decentralized aggregator execution entities engage in a number of training iterations with the multiple parties, where at each training iteration of the machine learning model, each party of the multiple parties:
        obtains a latest model update from each of the set of decentralized aggregator execution entities, produces a next model update using local training data, and provides the next model update to each of the set of decentralized aggregator execution entities, wherein response to receiving the next model update, the set of decentralized aggregator execution entities communicate via the secure communication channel to merge the next model updates into an aggregated machine learning model, and distribute the aggregated machine learning model to each party of the multiple parties, wherein each party of the multiple parties remotely authenticates hardware for each trusted execution environment containing a respective aggregator execution entity.

2. The method as described in claim 1, further including attesting to an integrity of the aggregator execution entity.

3. The method as described in claim 1, wherein the multiple parties partition respective model updates at model-parameter granularity and map single weights to one of the set of decentralized aggregator execution entities.

4. The method as described in claim 3, wherein an ordering of parameter or gradient elements in at least one partition are shuffled.

5. The method as described in claim 1, wherein, with respect to at least one other of the set of decentralized aggregator execution entities, the aggregator execution entity executes in one of: a different machine, a different data center, a different trusted execution environment architecture, and a different geo-location.

6. The method as described in claim 1, wherein loading the aggregator execution entity includes injecting a unique secret into encrypted physical memory of an encrypted virtual machine that provides the trusted execution environment and using the unique secret to authenticate the aggregator execution entity at registration of a party.

7. An apparatus, comprising:
a hardware processor; and
a computer memory holding computer program instructions executed by the hardware processor to provide federated learning with reduced information leakage of model aggregation, the computer program instructions configured to:
load each aggregator execution entity included in a set of decentralized aggregator execution entities into a separate trusted execution environment that acts as a trusted intermediary for isolating each aggregator execution entity from other aggregator execution entities in the set, where each trusted execution environment utilizes a distinct encryption key to provide runtime memory encryption protection for a respective aggregator execution entity;
register each of multiple parties with each of the aggregator execution entities included in the set of decentralized aggregator execution entities;
establish and maintain a secure communication channel between the aggregator execution entities for training synchronization during the federated learning;
distribute to each aggregator execution entity included in the set of decentralized aggregator execution entities an assigned portion of a partitioned model update for a machine learning model provided by the multiple parties; and
initiate execution of the set of decentralized aggregator execution entities to train the machine learning model using the assigned portions of the partitioned model update, wherein the set of decentralized aggregator execution entities engage in a number of training iterations with the multiple parties, where at each training iteration of the machine learning model, each party of the multiple parties:
obtains a latest model update from each of the set of decentralized aggregator execution entities,
produces a next model update using local training data, and
provides the next model update to each of the set of decentralized aggregator execution entities, wherein response to receiving the next model update, the set of decentralized aggregator execution entities communicate via the secure communication channel to merge the next model updates into an aggregated machine learning model, and distribute the aggregated machine learning model to each party of the multiple parties, wherein each party of the multiple parties remotely authenticates hardware for each trusted execution environment containing a respective aggregator execution entity.

8. The apparatus as described in claim 7, wherein the computer program instructions are further configured to attest to an integrity of the aggregator execution entity.

9. The apparatus as described in claim 7, wherein the multiple parties partition respective model updates at model-parameter granularity and map single weights to one of the set of decentralized aggregator execution entities.

10. The apparatus as described in claim 9, wherein an ordering of parameter or gradient elements in at least one partition are shuffled.

11. The apparatus as described in claim 7, wherein, with respect to at least one other of the set of decentralized aggregator execution entities, the aggregator execution entity executes in one of: a different machine, a different data center, a different trusted execution environment architecture, and a different geo-location.

12. The apparatus as described in claim 7, wherein the computer program instructions configured to load the aggregator execution entity further including computer program instructions configured to receive a unique secret in the trusted execution environment and to use the unique secret to authenticate the aggregator execution entity at registration of a party.

13. A computer program product in a non-transitory computer readable medium for use in a data processing system to provide federated learning with reduced information leakage of model aggregation, the computer program product holding computer program instructions that, when executed by the data processing system, are configured to:
load each aggregator execution entity included in a set of decentralized aggregator execution entities into a separate trusted execution environment that acts as a trusted intermediary for isolating each aggregator execution entity from other aggregator execution entities in the set, where each trusted execution environment utilizes a distinct encryption key to provide runtime memory encryption protection for a respective aggregator execution entity;
register each of multiple parties with each of the aggregator execution entities included in the set of decentralized aggregator execution entities;
establish and maintain a secure communication channel between the aggregator execution entities for training synchronization during the federated learning;
distributing to each aggregator execution entity included in the set of decentralized aggregator execution entities an assigned portion of a partitioned model update for a machine learning model provided by the multiple parties; and initiating execution of the set of decentralized aggregator execution entities to train the machine learning model using the assigned portions of the partitioned model update, wherein the set of decentralized aggregator execution entities engage in a number of training iterations with the multiple parties, where at each training iteration of the machine learning model, each party of the multiple parties:
- obtains a latest model update from each of the set of decentralized aggregator execution entities,
- produces a next model update using local training data, and
- provides the next model update to each of the set of decentralized aggregator execution entities, wherein response to receiving the next model update, the set of decentralized aggregator execution entities communicate via the secure communication channel to merge the next model updates into an aggregated machine learning model, and distribute the aggregated machine learning model to each party of the multiple parties, wherein each party of the multiple parties remotely authenticates hardware for each trusted execution environment containing a respective aggregator execution entity.

14. The computer program product as described in claim 13, wherein the computer program instructions are further configured to attest to an integrity of the aggregator execution entity.

15. The computer program product as described in claim 13, wherein the multiple parties partition respective model updates at model-parameter granularity and map single weights to one of the set of decentralized aggregator execution entities.

16. The computer program product as described in claim 15, wherein an ordering of parameter or gradient elements in at least one partition are shuffled.

17. The computer program product as described in claim 13, wherein, with respect to at least one other of the set of decentralized aggregator execution entities, the aggregator execution entity executes in one of: a different machine, a different data center, a different trusted execution environment architecture, and a different geo-location.

18. The computer program instructions as described in claim 13, wherein the computer program instructions configured to load the aggregator execution entity further including computer program instructions configured to receive a unique secret in the trusted execution environment and to use the unique secret to authenticate the aggregator execution entity at registration of a party.

19. A federated learning system that is secure against information leakage of model aggregation, comprising:
- a set of trusted execution environments; and
- an aggregator partitioned into a set of decentralized aggregator execution entities, with each aggregator execution entity loaded into a respective trusted execution environment that acts as a trusted intermediary for isolating each aggregator execution entity from other aggregator execution entities in the set, and each aggregator execution entity utilizes a respective distinct encryption key to provide runtime memory encryption protection;

wherein each party of multiple parties is registered with each of the aggregator execution entities included in the set of decentralized aggregator execution entities, and wherein a secure communication channel is established between the aggregator execution entities for training synchronization during the federated learning, and wherein an assigned portion of a partitioned model update for a machine learning model provided by the multiple parties is distributed to each aggregator execution entity included in the set of decentralized aggregator execution entities; and wherein execution of the set of decentralized aggregator execution entities is initiated to train the machine learning model using the assigned portions of the partitioned model update, wherein the set of decentralized aggregator execution entities engage in a number of training iterations with the multiple parties, where at each training iteration of the machine learning model, each party of the multiple parties:
- obtains a latest model update from each of the set of decentralized aggregator execution entities,
- produces a next model update using local training data, and
- provides the next model update to each of the set of decentralized aggregator execution entities, wherein response to receiving the next model update, the set of decentralized aggregator execution entities communicate via the secure communication channel to merge the next model updates into an aggregated machine learning model, and distribute the aggregated machine learning model to each party of the multiple parties, wherein each party of the multiple parties remotely authenticates hardware for each trusted execution environment containing a respective aggregator execution entity.

20. The federated learning system as described in claim 19, wherein, with respect to at least one other of the set of decentralized aggregator execution entities, an aggregator execution entity executes in one of: a different machine, a different data center, a different trusted execution environment architecture, and a different geo-location.

21. The federated learning system as described in claim 19, wherein the multiple parties partition respective model updates at model-parameter granularity and map single weights to one of the set of decentralized aggregator execution entities.

22. The method as described in claim 1, further comprising:
- partitioning a central aggregator into the set of decentralized aggregator execution entities, where each decentralized aggregator in the set is functionally-equivalent to each other; and
- launching a set of encrypted virtual machines, wherein each decentralized aggregator is loaded onto a respective encrypted virtual machine that provides a respective trusted execution environment for the decentralized aggregator.

* * * * *